(12) United States Patent
Chen et al.

(10) Patent No.: US 9,712,961 B2
(45) Date of Patent: *Jul. 18, 2017

(54) SYSTEM AND METHOD FOR ELECTRONIC COMMUNICATIONS BETWEEN USERS IN A SIMILAR GEOGRAPHIC LOCATION

(71) Applicants: Steve Y Chen, Skokie, IL (US); David Y Chen, Arlington Heights, IL (US)

(72) Inventors: Steve Y Chen, Skokie, IL (US); David Y Chen, Arlington Heights, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/151,136

(22) Filed: Jan. 9, 2014

(65) Prior Publication Data

US 2014/0128037 A1 May 8, 2014

Related U.S. Application Data

(63) Continuation of application No. 13/237,894, filed on Sep. 20, 2011, now Pat. No. 8,660,582.

(51) Int. Cl.
| | |
|---|---|
| *H04Q 7/10* | (2006.01) |
| *H04W 4/02* | (2009.01) |
| *H04W 4/14* | (2009.01) |
| *H04L 12/58* | (2006.01) |
| *H04L 12/18* | (2006.01) |
| *G06F 3/0488* | (2013.01) |
| *H04M 1/725* | (2006.01) |

(52) U.S. Cl.
CPC ........ *H04W 4/021* (2013.01); *G06F 3/04883* (2013.01); *H04L 12/1845* (2013.01); *H04L 51/20* (2013.01); *H04M 1/72547* (2013.01); *H04M 1/72572* (2013.01); *H04W 4/02* (2013.01); *H04W 4/14* (2013.01)

(58) Field of Classification Search
CPC ......... H04W 4/14; H04W 4/02–4/046; H04W 36/32; H04W 40/20; H04W 48/04; H04W 68/00–68/12
USPC ............... 455/456.1, 456.3, 457, 456.6, 466; 705/14.4, 14.45, 14.53, 14.58
See application file for complete search history.

(56) References Cited

U.S. PATENT DOCUMENTS

| | | | |
|---|---|---|---|
| 6,879,835 B2 * | 4/2005 | Greene .................... | H04W 4/02 455/406 |
| 7,016,689 B2 * | 3/2006 | Clark et al. ................ | 455/456.1 |
| 8,682,350 B2 * | 3/2014 | Altman et al. ............. | 455/456.3 |
| 8,793,397 B2 * | 7/2014 | Chan et al. .................... | 709/238 |

(Continued)

*Primary Examiner* — Kathy Wang-Hurst
*Assistant Examiner* — Julio Perez
(74) *Attorney, Agent, or Firm* — Michael J. Feigin, Esq.; Feigin & Fridman

(57) ABSTRACT

A method and system are provided providing electronic communications between users in a similar geographic location. Mobile devices determine geographic location information based on signals received from external devices, such as GPS satellites or cell sites, and web browsers determine geographic location using external devices or third party software, such as Google Loader, or based on the IP address of the computer running the web browser. The system receives geographic location information from a mobile device or web browser in addition to a user-input message. The system distributes the message to users of the system with geographic locations within a predetermined distance from the geographic location that the message was input.

8 Claims, 10 Drawing Sheets

(56) References Cited

U.S. PATENT DOCUMENTS

| | | | |
|---|---|---|---|
| 8,971,926 B2* | 3/2015 | Grunebach et al. | ........ 455/456.3 |
| 9,483,225 B2* | 11/2016 | Keranen | ............. G06F 3/04883 |
| 2002/0123327 A1* | 9/2002 | Vataja | ........................... 455/412 |
| 2004/0033808 A1* | 2/2004 | Rorabaugh | ............ G01S 5/0289 |
| | | | 455/456.1 |
| 2007/0255785 A1* | 11/2007 | Hayashi | ............ G06F 17/30017 |
| | | | 709/204 |
| 2007/0281716 A1* | 12/2007 | Altman | ............... H04L 12/5865 |
| | | | 455/466 |
| 2008/0045236 A1* | 2/2008 | Nahon | .................... H04W 4/12 |
| | | | 455/456.1 |
| 2008/0133336 A1* | 6/2008 | Altman | .............. G06Q 30/0207 |
| | | | 455/456.1 |
| 2011/0083101 A1* | 4/2011 | Sharon | ................ G06F 21/6245 |
| | | | 715/800 |
| 2012/0052880 A1* | 3/2012 | Hymel | ................. H04W 4/206 |
| | | | 455/456.3 |

\* cited by examiner

MAIN MESSAGES TABLE 270

| User ID | Message Text | Category | Timestamp | Longitude | Latitude |
|---|---|---|---|---|---|
| mike18 | The traffic on 294 is really bad! | Emergency | 7/1/2011 5:30PM | 64.322 | 108.53 |
| mike18 | Free for lunch? Let's meet up! | Meetings | 7/2/2011 10:12AM. | 62.14 | 106.63 |
| sally | I lost my dog! It's a brown pup... | Emergency | 7/8/2011 3:15PM | 88.23 | 112.0 |
| Scott4321 | Party tonight at Club Miami! | Events | 7/15/2011 11:00PM | 53.8 | 134.8 |
| Brad2011 | Need a 5th for basketball... | | 7/19/2011 9:15AM | 83.21 | 114.45 |
| Steph21 | Sale at DSW! 50% off all shoes! | Sales | 7/21/2011 2:30 PM | 61.44 | 110.29 |

FIGURE 2D

SYSTEM AND METHOD FOR ELECTRONIC COMMUNICATIONS BETWEEN USERS IN A SIMILAR GEOGRAPHIC LOCATION

TECHNICAL FIELD

The present invention relates generally to the field of electronic communications and specifically to techniques for electronic communications between users in a similar geographic location.

BACKGROUND OF THE INVENTION

Electronic communications services, such as Twitter, use the Internet to display user-input messages to the global base of Internet users, who choose which specific messages they choose to read based on personal criteria, such as topic or author.

Other methods of electronic communication, such as electronic mail, Yahoo! Messenger or Facebook Messaging use the Internet to allow a user to send messages that are transmitted instantly to one or more recipients that the user must specify.

Mobile devices have their own methods of electronic communications, such as SMS or MMS text messaging between devices. A user must specify one or more recipients, and create and send a text message which is transmitted instantly to the mobile devices of the one or more recipients.

Currently, there are no existing systems for distributing user-input messages to all users of the system in a predetermined geographic location without the need for the sender of the message to create a list of specific recipients. There is a need, therefore, for techniques that allow users to create messages that are instantly accessible by users in a similar geographic location.

BRIEF SUMMARY OF THE INVENTION

Within the context of this invention, the terms "web site," "web site's URL," and "web site's IP address" are considered interchangeable.

Described herein is a method, system and computer implementation for providing users in a similar geographic location with electronic communications.

Specifically, a user is allowed to submit a message using a mobile device or web browser, where the geographic location of the mobile device or web browser is associated with the message. The geographic location of the mobile device is determined by external devices, such as GPS satellites and cell sites, and the geographic location of the web browser is determined by a plurality of methods, including third party software, such as Google Loader, or external devices, such as routers. The geographic location of the web browser can also be determined based on the IP address of the computer running the web browser. The user can also submit electronic media such as photographs and videos to be attached to or associated with the message. The user can also position the message and any electronic media attachments on the screen of the mobile device as a graphics overlay on the live video stream output as captured by the integrated camera of the mobile device to create a graphic associated with that geographic location.

According to another embodiment, the user is allowed to input the geographic location in addition to the message, thus specifying the geographic location of the intended recipients of the message.

After the message is submitted, it is electronically distributed to users of the system using mobile devices or web browsers in geographic locations within a predetermined distance of the geographic location associated with the message. The message can be transmitted to mobile devices via push notification or SMS/MMS messaging. The message can also be received by a mobile device via scheduled or manual download. The message can also be received by a web browser. The message can also be transmitted to recipients via email. The message can also be transmitted to third party applications, such as Twitter or Facebook.

According to another embodiment, the message is distributed to the mobile device of a user when geographic location attributable to the mobile device is the same as the geographic location associated with the message. The message is received by the mobile device via scheduled or manual download once the geographic location of the mobile device matches the geographic location associated with the message. The message can also be transmitted to the mobile device via push notification or SMS/MMS messaging once the geographic location of the mobile device matches the geographic location associated with the message. The message can also be displayed as a graphics overlay on the live video stream output of the integrated camera of the mobile device.

In keeping with various embodiments, a method is provided for rating users. The method includes receiving a user input comprising a numerical rating of a user in accordance with predetermined criteria.

BRIEF DESCRIPTION OF THE SEVERAL VIEWS OF THE DRAWING(S)

FIG. 2D depicts a main messages table for storing user-input messages and their associated categories and geographic locations;

DETAILED DESCRIPTION OF THE INVENTION

Figure 1:
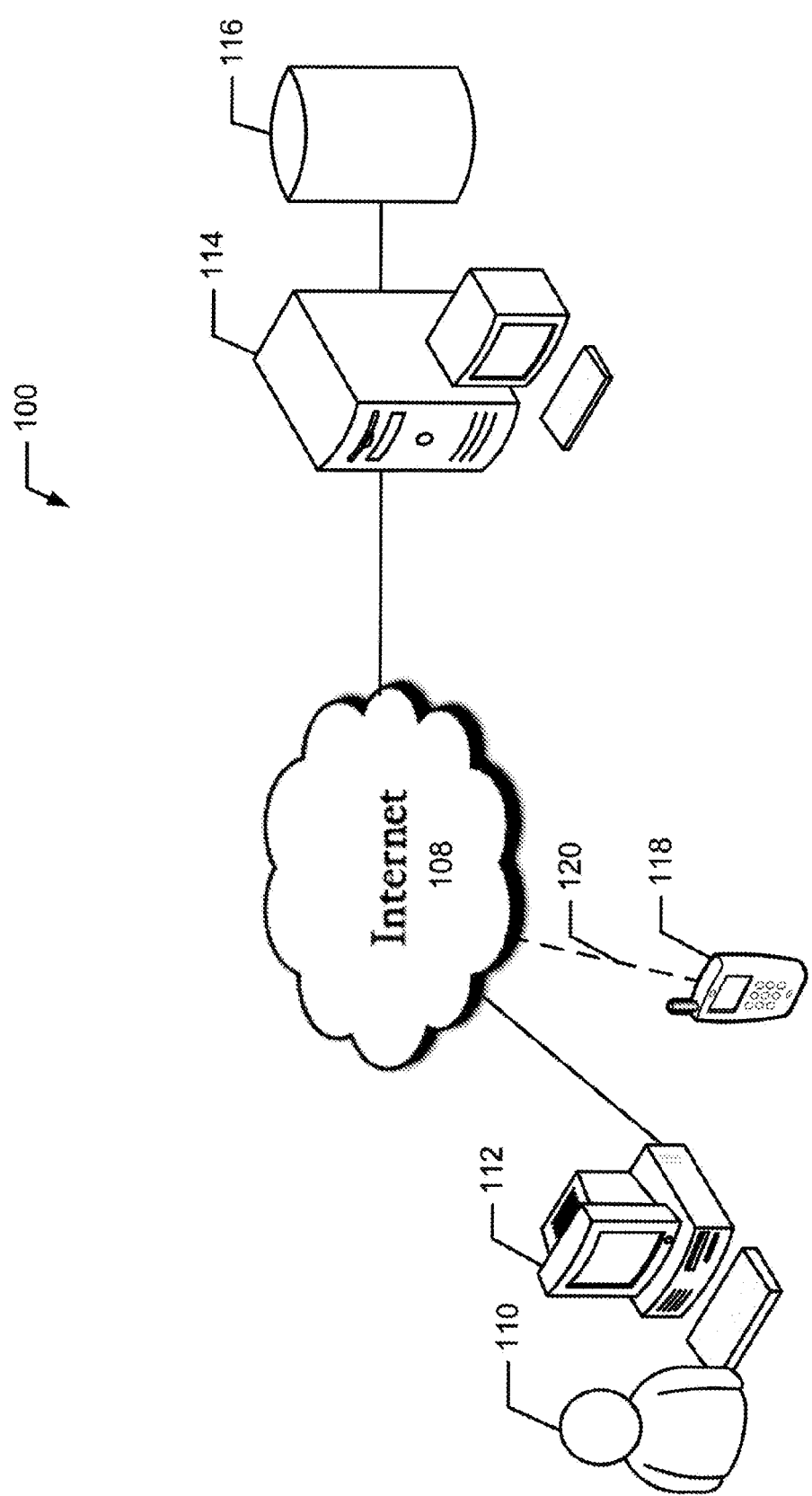
FIG. 1 depicts a system for providing electronic communications between users in a similar geographic location.

Now turning to the drawings and referring to FIG. 1, a system 100 is depicted therein according to one embodiment of the invention for providing user-initiated electronic communications between users in a similar geographic location with user-input messages stored in a computer readable medium of a digital database.

System 100 includes an application server 114 for providing web-based application services for user-initiated electronic communications between users in a similar geographic location. Specifically, the application server 114 includes one or more computer readable media 116 that store computer code for executing instructions comprising web-based application services. The computer codes for implementing the web-based application is executed by the application server 114 that is accessed by a user terminal 112 via a web browser over a network 108, such as the Internet or an intranet. As further shown in FIG. 1, a user terminal can also take form of a cell phone or smart phone 118 connected to the Internet 108 through a wireless connection 120. Similarly, the cell phone or smart phone 118 can access the application server 114 through the Internet 108 and render a mobile web browser or mobile device application interface for providing the electronic communications functionalities described herein.

The web-based application is coded in a browser-supported language (such as HTML, JavaScript, Java, etc.) and relies on a common web browser (such as Internet Explorer, Firefox, Chrome, etc.) to render the application on the user terminal 112. In particular, when accessing the web-based application services provided by the application server 114, the user 110 starts a web browser on the user terminal 112 and inputs a URL or an IP address associated with the web-based application. In response to the connection request, the application server 114 transmits program codes in the form of the browser-supported language to the user terminal 112. Upon being executed by the web browser running on the user terminal 112, the program codes instruct the web browser to render user interfaces to interact with the user 110. According to the various embodiments, the user interfaces are designed to allow users to input electronic messages, to input electronic media files, such as photos and videos, and to allow users to read electronic messages and access electronic media files input by users in a specific geographic location. The electronic communication between users in a similar geographic location is further discussed below.

The user 110 can also access the web-based application services using a mobile device application. The mobile device application is coded in a mobile device-supported language (such as Java, Objective C, etc.) and relies on a common mobile device operating system (such as iOS, Android, Windows Mobile, etc.) to render the application on mobile device 118. In particular, when accessing the web-based application services provided by the application server 114, the user 110 starts the mobile device application on mobile device 118, which connects to a URL or an IP address associated with the web-based application. In response to the connection request, the application server 114 transmits a data response to the mobile device 118. The mobile device application running on the mobile device 118 renders user interfaces to interact with the user 110 based on the data response received from server 114. According to the various embodiments, the user interfaces are designed to allow users to input electronic messages, to input electronic media files, such as photos and videos, and to allow users to read electronic messages and access electronic media files input by users in a specific geographic location. The electronic communication between users in a similar geographic location is further discussed below.

The application server 114 further includes a database 116 for storing electronic user-input messages. The database 116 includes a plurality of tables for storing the messages. Specifically, as shown in FIG. 2D, one of these tables is a main messages table 270 for storing the messages input by all of the users of the system 100. The main messages table stores the messages input by each user and the geographic location of the mobile device or web browser used by each user to submit the message at the time the message was submitted. The geographic location is stored in degrees latitude and longitude. The main messages table also stores the date and time that the message was submitted. For example, the user "mike18" submitted two different messages on two different days, from two different locations.

The database 116 can take forms of SQL database, OQL databases, proprietary databases, or other commercially available databases well known to one skilled in the art.

Figure 2A:
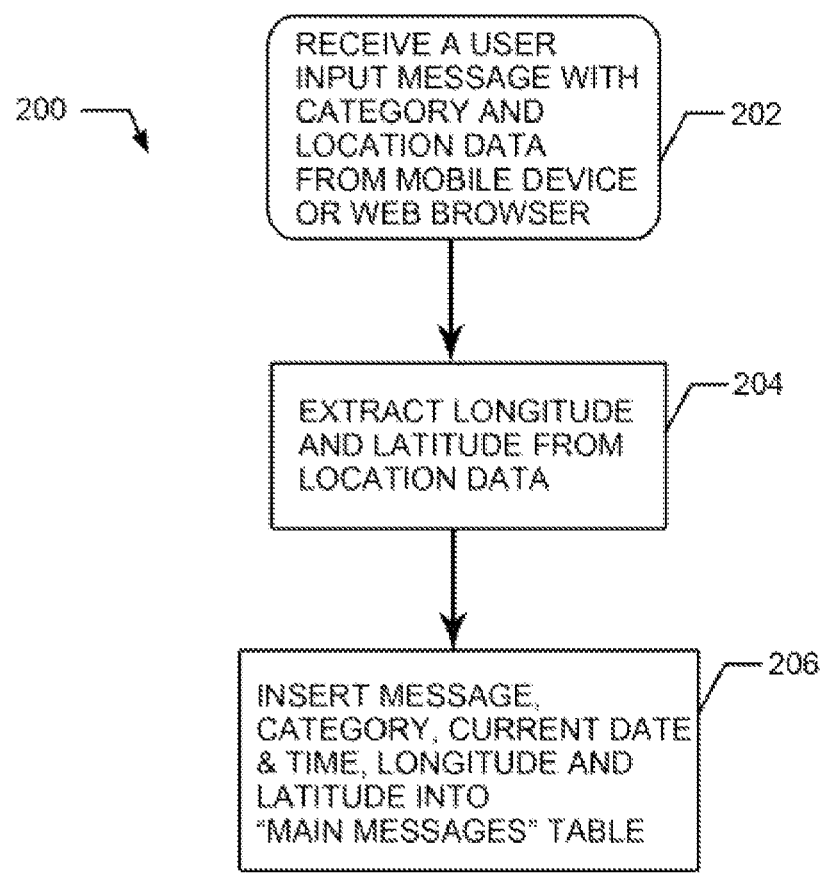
FIG. 2A depicts a method for creating a new message.

FIG. 2 depicts a process 200, when executed by the web application, instructs the server 114 to receive user-input messages. The process 200 also instructs the server 114 to return specific messages based on the geographic location of the user requesting the messages. In keeping with the embodiment depicted in FIG. 2A, the process 200 first instructs the server 114 to receive a user-input message and the geographic location data attributable to the mobile device or web browser used by the user to submit the message (step 202). The geographic location of a mobile device is determined by external devices, such as GPS satellites and cell sites, and the geographic location of a web browser is determined by a plurality of methods, including third party software, such as Google Loader, or external devices, such as routers. The geographic location of the web browser can also be determined based on the IP address of the computer running the web browser. The process 200 extracts the longitude and latitude from the geographic location data (step 204). The user-input message and the associated longitude and latitude are added to the main messages table 270 as a new entry (step 206).

Alternatively, the geographic location data may be input by the user. In keeping with the embodiment depicted in FIG. 2A, the geographic location data received by server 114 would be input by the user at the same time as the message (step 202). The geographic location data can be input in several formats, including but not limited to longitude and latitude, zip code, or telephone area code.

In keeping with the embodiment depicted in FIG. 2A, a category, such as "Sales", "Events", or "Emergency", may be input by the user or selected by the user from a predetermined list at the same time as the message and received by the server 114 at the same time as the message (step 202). The user-selected category is added to the main messages table 270, along with the user-input message, and the longitude and latitude.

In keeping with this embodiment, the user-input message may be automatically submitted to one or more third-party applications, such as Twitter and Facebook. For example, in the case of Twitter, upon submitting the message, the user may be prompted for a Twitter username and password to log in to Twitter using the Twitter oAuth API. After logging in, the message would be posted automatically as a new "Tweet" under the account of the user, along with all electronic media attachments, such as photo or video. In the case of Facebook, upon submitting the message, the user may be prompted for a Facebook username and password to log in to Facebook using the Facebook Connect API. After logging in, the message would be posted automatically to the Facebook Wall of the user as a new status update, along with all electronic media attachments, such as photo or video.

Figure 2B:
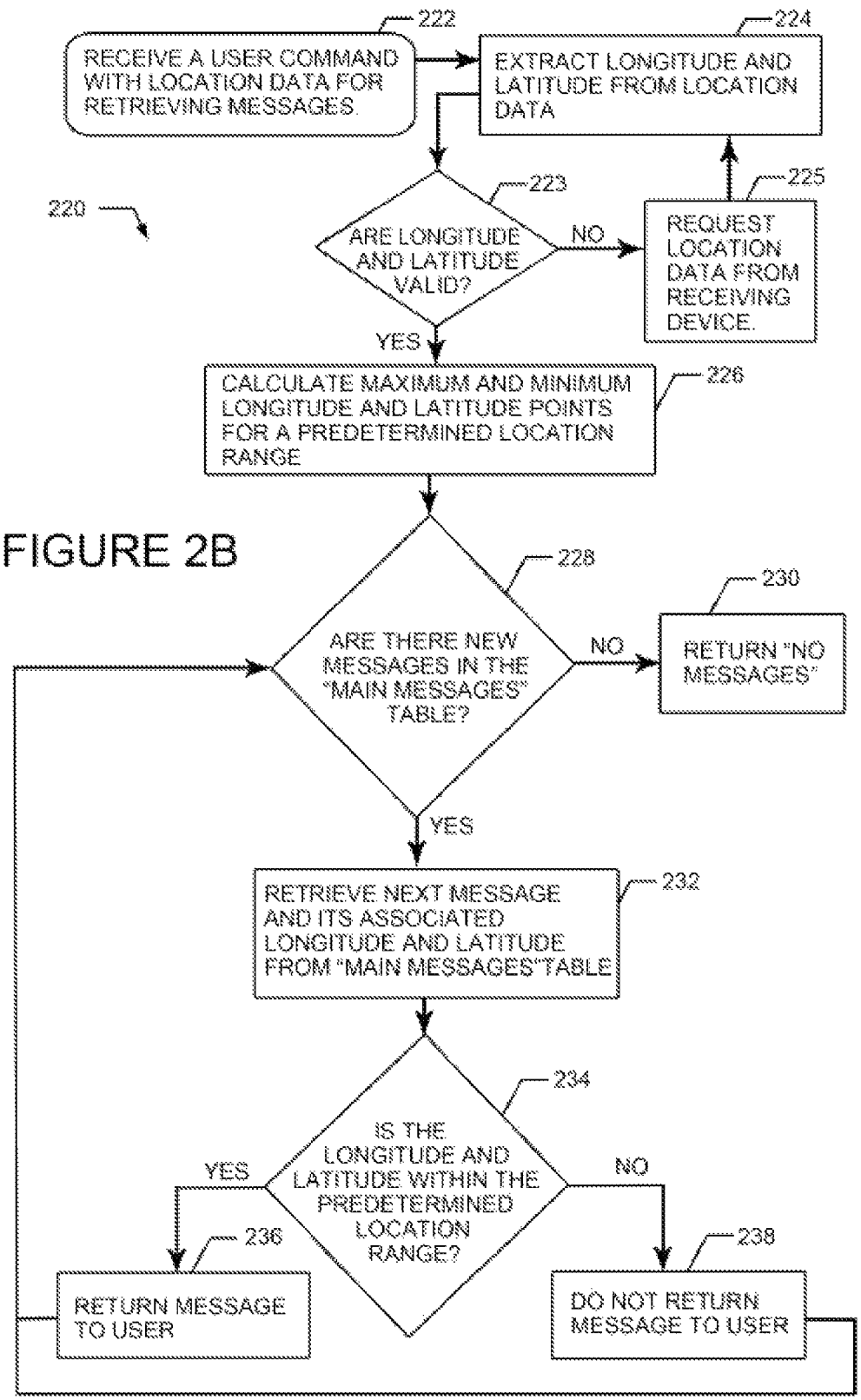
FIG. 2B depicts a method for displaying messages with associated geographic locations within a predetermined range of a mobile device or web browser attributable to at least one recipient.

FIG. 2B illustrates the process 220, when executed by the web application, instructs the server 114 to return all messages within a predetermined geographic range. According to FIG. 2B, a user command or automated command comprising a request for messages is received (step 222). The user command or automated command is submitted by the user via mobile device or web browser and contains geographic location data from the mobile device or web browser. The longitude and latitude is extracted from the geographic location data (step 224). The server 114 calculates the maximum longitude and minimum longitude and the maximum latitude and minimum latitude to create a predetermined location range (step 226). For example, if the geographic range is predetermined to be two miles, the server 114 would calculate the number of degrees of longitude and number of degrees of latitude corresponding to one mile at the longitude and latitude of the user (the delta of the longitude and the delta of the latitude). One skilled in the art would recognize that these equations will vary based on the geographic location of the user. The delta of the longitude would be subtracted from the longitude of the user to create the minimum longitude, and the delta of the longitude would be added to the longitude of the user to create the maximum longitude. Similarly, the delta of the latitude would be subtracted from the latitude of the user to create the minimum latitude, and the delta of the latitude would be added to the latitude of the user to create the maximum latitude. The server 114 checks the main messages table to determine if there are messages present that need to be returned (step 228). If not, a "no messages" status is returned (step 230). Messages that need to be returned may include all messages, all messages that have not yet been returned to the user, or all messages received after the most recent date that the user requested messages. If messages are present, the server retrieves the first message (step 232) and determines if the longitude associated with the message is greater than the minimum longitude and less than the maximum longitude, and if the latitude associated with the message is greater than the minimum latitude and less than the maximum latitude (step 234), thus falling within the predetermined location range. If the geographic location associated with the message falls within the predetermined location range, the message is returned to the user (step 236). If not, the message is not returned (step 238). The server 114 checks the database 116 for additional messages that need to be returned to the user (step 228). Alternatively, the server 114 can instruct the database 116 to return a single database recordset comprising all messages that fall within the predetermined location range. The server 114 distributes the messages contained within the database recordset to the user.

Alternatively, if the geographic location associated with a message was input by the original sender as a telephone area code, the message would be returned to all users with phone numbers containing that area code.

In keeping with the embodiment depicted in FIG. 2B, the server 114 would further receive a category, such as "Sales", "Events" or "Emergency", input by the user or selected by the user from a predetermined list (step 222). The server 114 checks the main messages table to determine if there are messages corresponding to the user-selected category present (step 228). If messages are present, the server retrieves the next message (step 232). If not, a "no messages" status code is returned (step 230). Alternatively, the server can instruct the database 116 to return a single database recordset comprising all messages corresponding to the user-selected category that fall within the predetermined location range. The server 114 then distributes the messages contained within the database recordset to the user.

In an alternative embodiment, the user would input a desired geographic location. For example, a user located in Chicago would be able to view messages associated with Los Angeles by inputting the geographic location information for Los Angeles. The geographic location data can be input in several formats, including but not limited to longitude and latitude, zip code, or telephone area code.

Figure 2C:
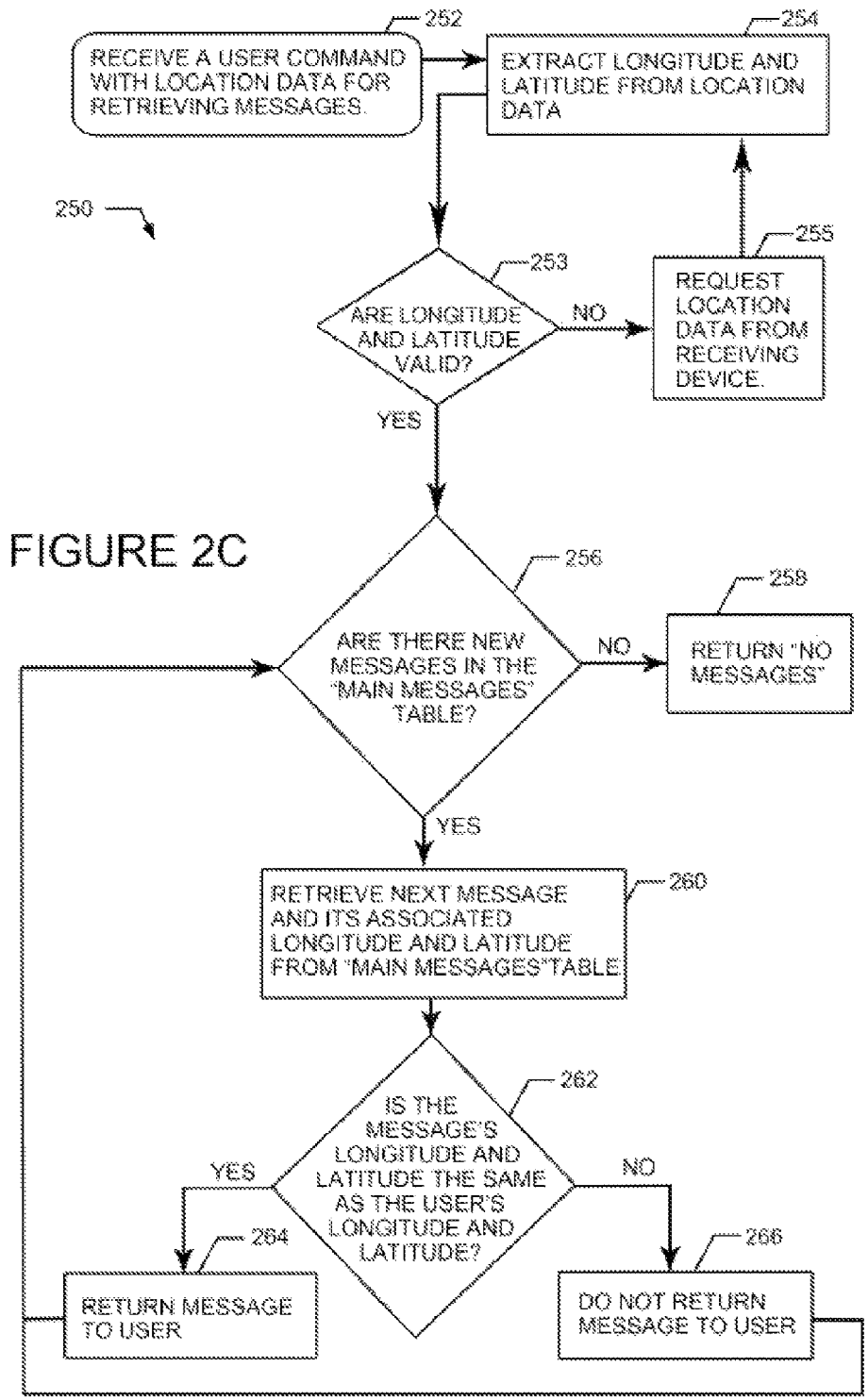
FIG. 2C depicts a method for displaying messages with associated geographic locations with the same geographic location as a mobile device or web browser attributable to at least one recipient.

FIG. 2C illustrates an alternative embodiment, process 250, when executed by the web application, instructs the server 114 to return all messages at the same geographic location. According to FIG. 2C, a user command or automated command for requesting messages is received (step 252). The user command or automated command is submitted by the user via mobile device or web browser and contains geographic location data from the mobile device or web browser. The longitude and latitude is extracted from the geographic location data (step 254). The server 114 checks the main messages table to determine if there are messages present that need to be returned (step 256). If not, a "no messages" status is returned (step 258). Messages that need to be returned can include all messages, all messages that have not yet been returned to the user, or all messages received after the last date that the user requested messages. If messages are present, the server retrieves the first message (step 260) and determines if the longitude and latitude associated with the message are equal to the longitude and latitude extracted from the geographic location data received from the user (step 262). If the longitudes and latitudes are equal, the message is returned (step 264). If not, the message is not returned (step 266). The server checks the database 116 for more messages (step 256). Alternatively, the server 114 can instruct the database 116 to return a single database recordset comprising all messages with associated longitudes and latitudes equal to the longitude and latitude extracted from the geographic location data received from the user. The server 114 then distributes the messages contained within the database recordset to the user.

In keeping with the embodiment depicted in FIG. 2C, the server 114 would further receive a category, such as "Sales", "Events" or "Emergency", input by the user or selected by the user from a predetermined list (step 252). The server 114 checks the main messages table to determine if there are messages corresponding to the user-selected category present (step 256). If messages are present, the server retrieves the next message (step 260). If not, a "no messages" status code is returned (step 258). Alternatively, the server can instruct the database 116 to return a single database recordset comprising all messages corresponding to the user-selected category with associated longitudes and latitudes equal to the longitude and latitude extracted from the geographic location data received from the user. The server 114 then distributes the messages contained within the database recordset to the user.

FIG. 2D illustrates an exemplary embodiment for the main messages table (270). As discussed above, the main messages table 270 shown in FIG. 2D is a global table for storing all messages input into the system 100. The main messages table 270 includes a User ID column to store the User ID of the sender of the message, a Message Text column to store the text of the message, and a Timestamp column to store the date and time the message was submitted. The main messages table 270 further includes a Category column to store the user-selected category associated with the message. The main messages table 270 further includes Longitude and Latitude columns to store the geographic location attributable to the mobile device or web browser used by the sender to submit the message at the time the message was submitted. One skilled in the art would understand that the system 100 has a plurality of tables to store additional user data, such as "email address", "phone number" and the like.

Figure 3:
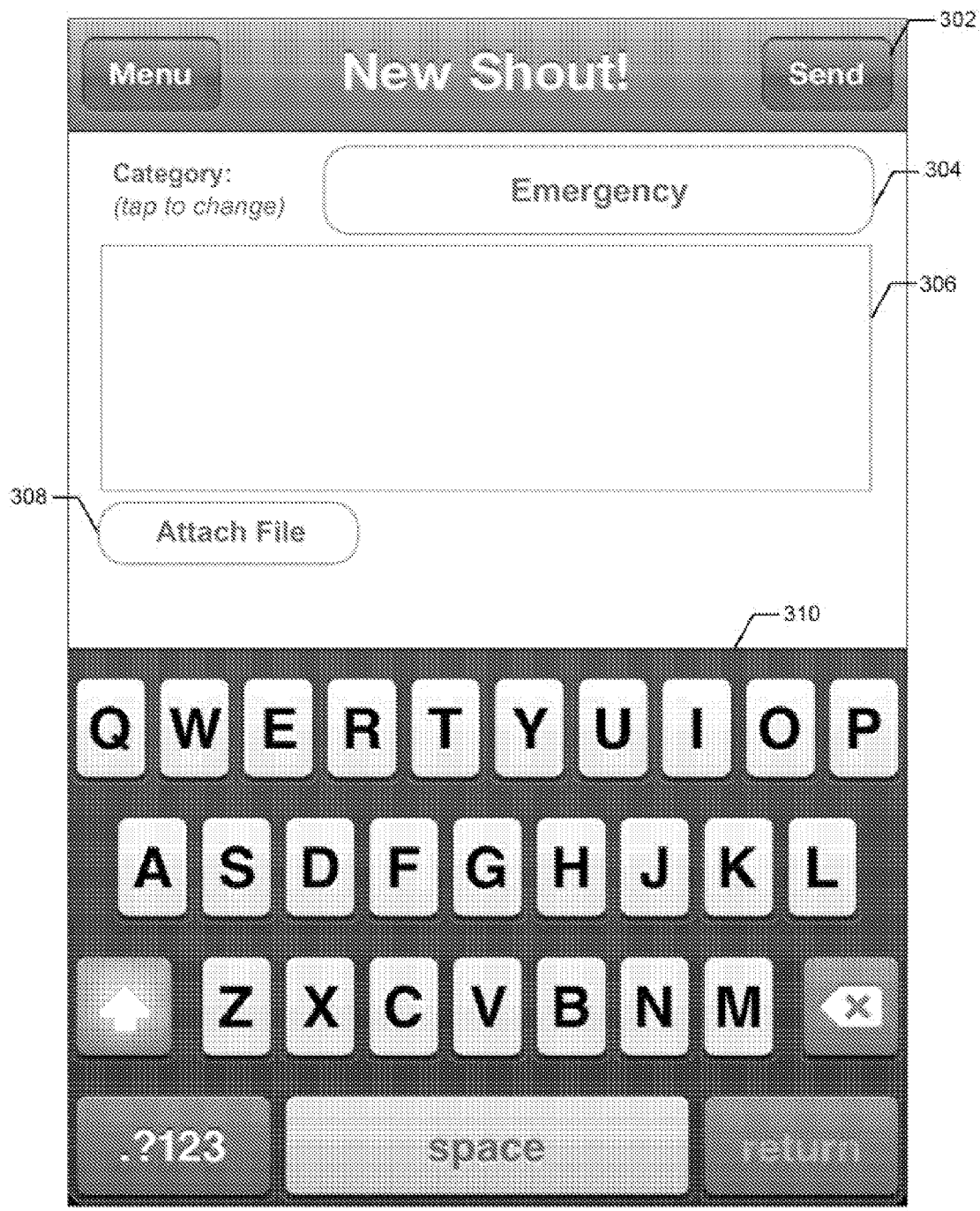
FIG. 3 depicts an exemplary user interface for inputting a new message.

FIG. 3 shows one embodiment of the interface to create a user-input message for a mobile device application. As shown in FIG. 3, the interface 300 includes a number of fields, such as text boxes, menus, and buttons, for the user to interact with the process 200. In particular, the interface 300 includes a Category button 304 for a user to select the category associated with the message. The interface 300 also includes a text field 306 for the user to input the message, and a software QWERTY-keyboard interface 310 for the user to type the characters of the message. The interface 300 also includes an "Attach File" button 308 for the user to attach an electronic file, such as an electronic photograph or video. When the user clicks the "Send" button 302, the message, category and attached photo or video is transmitted to server 114. The geographic location of the mobile device, determined by external devices such as GPS satellites and cell sites, is also transmitted to server 114. The web application on application server 114 processes the message according to the process 200 depicted in FIG. 2A.

Figure 4:
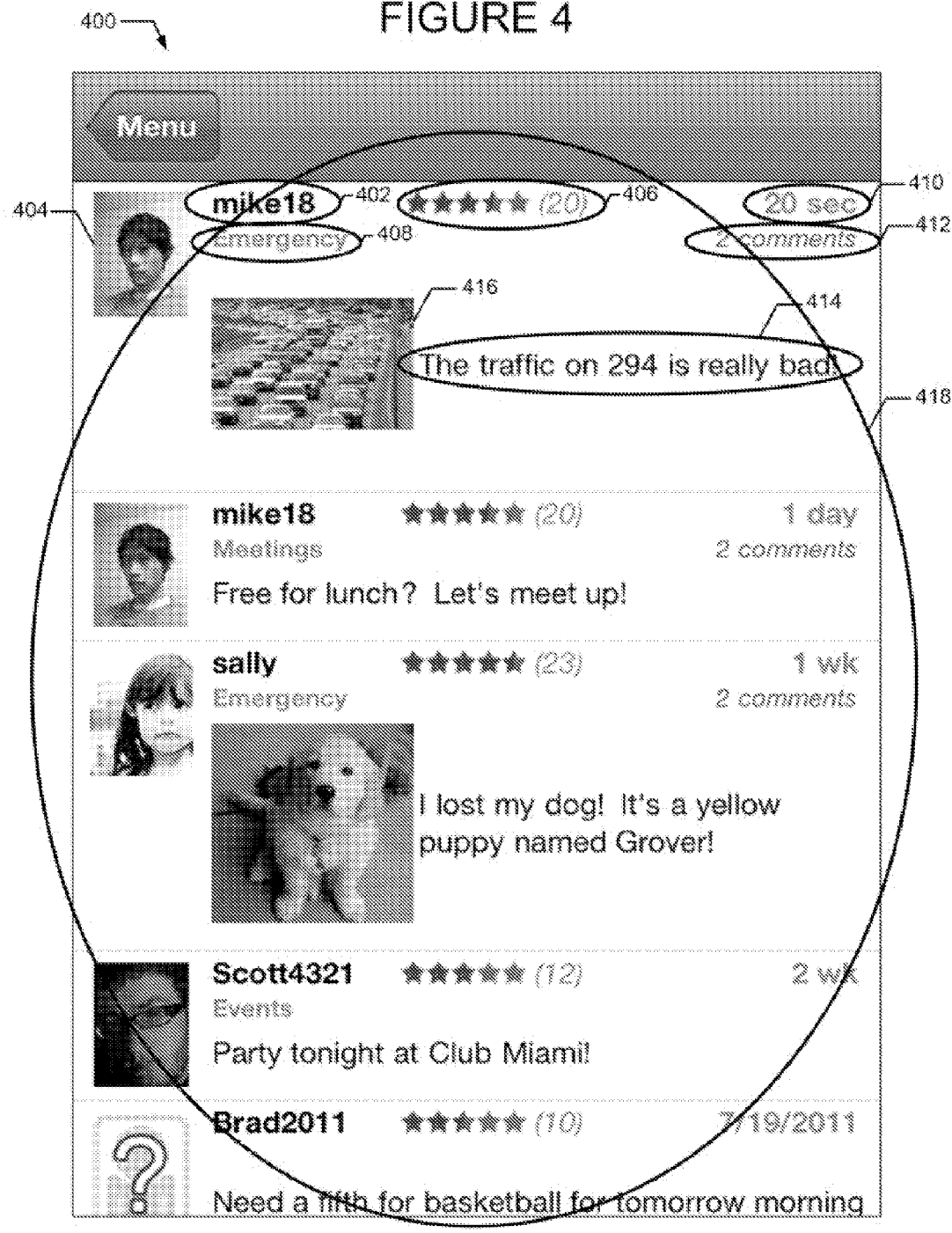
FIG. 4 depicts an exemplary user interface for viewing a list of user-input messages.

FIG. 4 depicts an exemplary embodiment of a user interface for a user to retrieve a plurality of messages for a mobile device according to the process 220. As shown in FIG. 4, in response to a user command for requesting messages, the interface 400 displays a list of messages obtained in result field 418.

In the interface 400, each message obtained in result field 418 includes a field 402 for displaying the User ID of the user who created the message and a field 404 for displaying a user-input electronic photograph representing the user. The field 404 is a button that, when clicked, displays the user interface 500 to view the detailed profile information of the user. The interface 400 also includes a field 410 in each message in result field 418 for displaying the date and time of the message. Field 410 can be displayed in several formats, such as duration of time since the message was added or a standard date and time. In this embodiment, the interface 400 also includes a field 408 to display the category associated with each message.

The interface 400 further includes a field 414 for displaying the text of each message, and if an electronic file, such as a photograph or video, is attached, a field 416 for displaying a thumbnail representation of the electronic file. The thumbnail representation 416 is a button that, when clicked, displays the electronic file.

The interface 400 further includes field 406 for displaying a rating associated with each user as specified by the global user population. In this embodiment, the field 406 further includes the number of ratings submitted by the global user population. The rating of a user may determine if the messages submitted by the user are distributed to other users. For example, the server 114 may limit the distribution of messages to only messages submitted by users with ratings greater than or equal to a predetermined rating threshold. Alternatively, the rating threshold may be selected by the user. The interface 400 further includes field 412 for displaying the number of comments associated with each message as input by the global user population. The field 412 is a button that, when clicked, displays the comments associated with the message.

Figure 5:
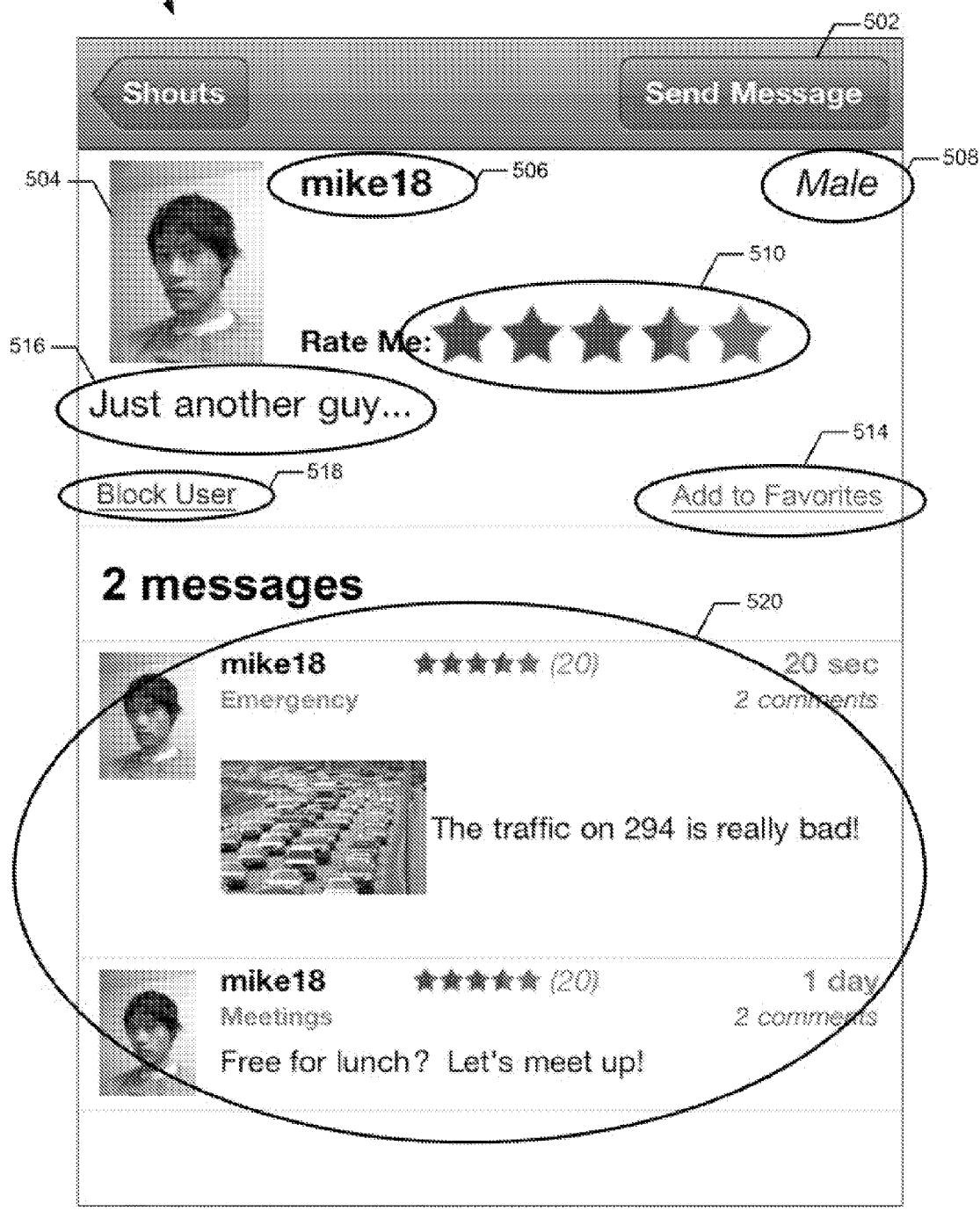
FIG. 5 depicts an exemplary user interface for viewing a detailed user profile.

FIG. 5 depicts one embodiment of a user interface for a user of system 100 to view the detailed profile information of another user. As shown in FIG. 5, the interface 500 displays detailed profile information for the user "mike18".

The interface 500 includes a field 506 for displaying the User ID of the user and a field 504 for displaying the user-input electronic photograph representing the user. Interface 500 also includes a field 508 for displaying the user-selected gender associated with the user and a field 516 for displaying a brief description as input by the user. The interface 500 also includes a field 510 for selecting a numerical rating for the user. Each star in field 510 is a button that, when clicked, submits a rating for the user. The interface 500 further includes a field 520 for displaying all messages that have been submitted by the user. The fields that comprise field 520 are identical to the fields that comprise result field 418 in the interface 400. The interface 500 further includes a button 502 for sending a private message to the user.

The interface 500 further includes a button 514 for adding the user to a "Favorite Users List." For example, if User 1 adds User 2 to his or her "Favorite Users List," all messages submitted by User 2 are distributed to User 1, regardless of the geographic locations associated with the messages.

According to an alternative embodiment, a user can add users to a "Favorite Users List" by importing users from third party applications, such as Facebook and Twitter. For example, the server 114 can use the Facebook Connect API to access the Friends List of a user to recommend users to add to his or her "Favorite Users List."

The interface 500 further includes a button 518 for adding a user to a "Blocked Users List." For example, if User 1 adds User 2 to his/her "Blocked Users List", system 100 will not distribute any messages created by User 2 to User 1.

According to another embodiment, the global user population of the system 100 can be limited to a specific group of users. For example, a company with offices in different locations can use the system 100 to send messages to employees at a specific corporate office using the processes described in FIG. 2.

Figure 6:
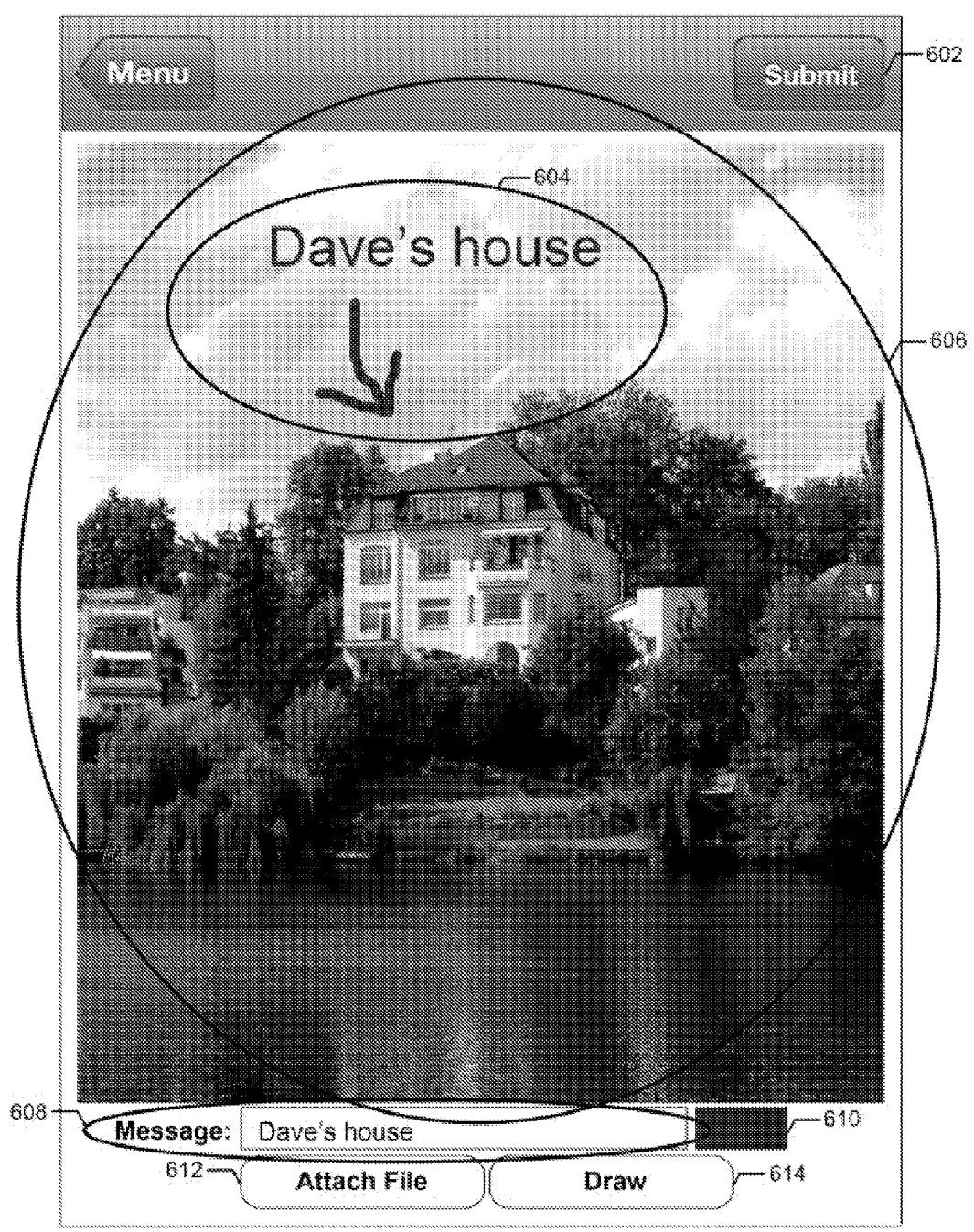
FIG. 6 depicts an exemplary user interface for inputting and positioning a new message on the live video stream output from the integrated camera of a mobile device.

According to some other embodiment, the mobile device application may access the integrated camera of a mobile device and display the live video stream captured by the camera to the user of the mobile device. The user may position the camera to a desired field of view and create a message comprising text and electronic media attachments, such as user-input graphics, photographs or video, and position the message as a graphics overlay at the desired position on the video stream. FIG. 6 depicts an exemplary embodiment for a user of system 100 to create and position a message on the video stream output of a mobile device. The interface 600 includes a field 606, the live video stream output of the camera on the touch screen interface of the mobile device, for positioning the user-input message and any user-input graphics or attachments. The interface 600 further includes a field 608 for the user to input a message and a field 610 to select the color of the text. The interface 600 also includes an "Attach File" button 612 for the user to attach an electronic file, such as an electronic photograph or video. The interface 600 also includes a "Draw" button 614 for the user to create a graphic by drawing on the touch screen interface of the mobile device. In this example, the message "Dave's house" with a drawing of an arrow pointing downwards has been positioned on the screen (604). The interface 600 also includes a "Submit" button 602 for submitting the message to server 114. The mobile device-based application would send to the server 114 the user-input message, any electronic media attachments, the Cartesian coordinate pair, consisting of an x coordinate and a y coordinate, specifying the position of the graphics overlay on the screen of the mobile device, the geographic location of the mobile device, and measurements from the integrated accelerometer of the mobile device, such as pitch, yaw, and orientation.

Figure 7:
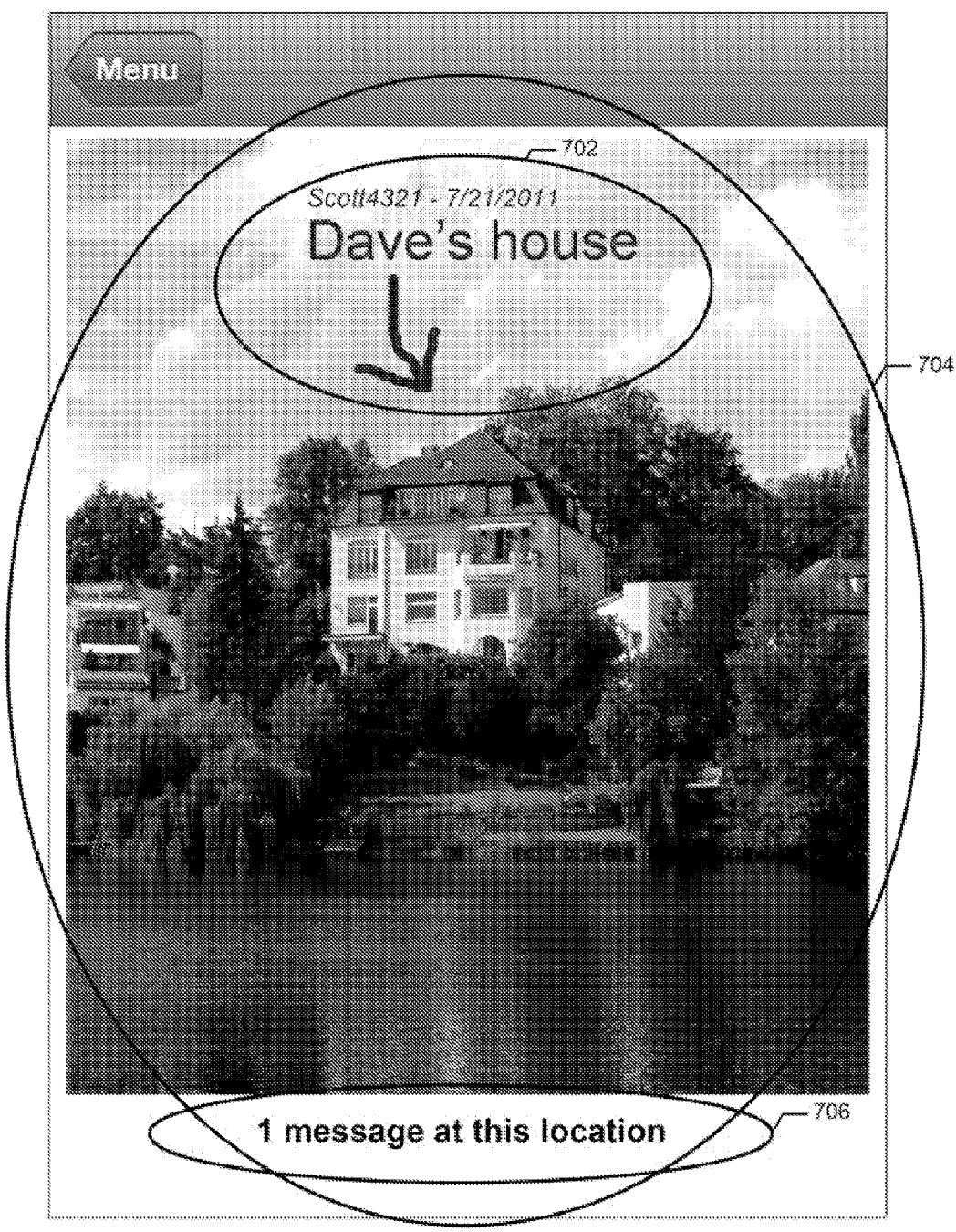
FIG. 7 depicts an exemplary user interface for viewing user-input messages on the live video stream output from the integrated camera of a mobile device.

In keeping with this embodiment, when the geographic location of a mobile device attributable to a second user is the same as the geographic location associated with at least one user-input message, the mobile device application will display the at least one message and any associated electronic media, such as graphics or photographs, as a graphics overlay rendered onto the live video stream captured by the integrated camera of the mobile device, at a position on the video stream calculated by adding an offset to the Cartesian coordinate pair specifying the position of the message on the screen associated with the at least one message, where said offset is calculated based on the differences between the measurements from the integrated accelerometer of the mobile device and the measurements from the accelerometer associated with the at least one message, in addition to the geographic location of the user and the geographic location associated with the at least one message. FIG. 7 depicts an exemplary embodiment for the user to view one or more messages created by other users. The interface 700 includes a field 704, the live video stream output of the camera on the touch screen interface of the mobile device, for viewing user-input messages and any user-input graphics or attachments. The interface 700 further includes a field 706 for displaying the number of messages being displayed. In this example, a User 1 ("Scott4321") had pointed the integrated camera of his mobile device at a house and created a message reading "Dave's house" with a graphic of an arrow over the rendering of said house on the live video stream output of said camera using the mobile device application. If a User 2 stands at a similar geographic location as User 1, and points the integrated camera of his or her mobile device at the same house while using the mobile device application, the message "Dave's house", the graphic of the arrow, the username of User 1, and the date the message was created are all rendered in one graphic (702) by said mobile device application at a similar position over the rendering of said house on the live video stream output (field 704) of said camera on the screen of said mobile device. One skilled in the art would recognize that the equations used to calculate the position of the user-input message on the screen will vary based on the geographic location of the user.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A geographic-based message storage and delivery method, comprising steps of:
   determining a longitude and latitude of a first mobile transmission device;
   at a server, receiving from said first mobile transmission device a message retrieval request;
   determining if messages generated within a predefined x and y distance from said longitude and latitude of said first mobile transmission device have previously been stored in a tangible storage medium associated with said server;
   selecting from said messages previously stored in said tangible data storage medium at least one said stored message generated within said pre-defined x and y distance of said first mobile transmission device, wherein said at least one selected message originated from at least a second mobile transmission device;
   if a location associated with at least said second mobile transmission device is presently unknown or has changed, polling said second mobile transmission device for a present longitude and latitude; and
   transmitting at least one said selected message, generated by said second mobile transmission device within said pre-defined x and y distance, from said data storage medium to said first mobile transmission device;
   wherein said transmitting comprises transmitting to said first mobile transmission device, together with said at least one said selected message transmitted to said first mobile transmission device, a Cartesian coordinate pair specifying a position at which said message was displayed on a screen of said second mobile transmission device for reproduction of a position at which said at least one selected message should be displayed on a second screen associated with said first mobile transmission device.

2. The method of claim 1, wherein said request for messages from said first mobile transmission device is limited to messages within a specific category and x and y distance from a present said longitude and said latitude, irrespective of named locations or topography within said distance.

3. The method of claim 1, wherein each said transmitted message is rendered as a graphic overlay, as generated on said second mobile transmission device, simultaneously with live video from said first mobile transmission device.

4. The method of claim 1, wherein an approximate location is determined for either said first or second mobile transmission device based on IP (internet protocol) address, and said method of claim 1 is carried out; and
  when more precise location becomes available based on global positioning system data (GPS) said method of claim 1 is carried out a second time using said more precise location data.

5. A geographic-based message storage and delivery method, comprising steps of:
  determining a longitude and latitude of a first mobile transmission device;
  at a server, receiving from said first mobile transmission device a message retrieval request;
  determining if messages generated within a predefined x and y distance from said longitude and latitude of said first mobile transmission device have previously been stored in a tangible storage medium associated with said server;
  selecting from said messages previously stored in said tangible data storage medium at least one said stored message generated within said pre-defined x and y distance of said first mobile transmission device, wherein said at least one selected message originated from at least a second mobile transmission device;
  if a location associated with at least said first mobile transmission device is presently unknown or has changed, polling said first mobile transmission device for a present longitude and latitude; and
  transmitting at least one said selected message, generated within said pre-defined x and y distance of said present longitude and latitude, from said data storage medium to said first mobile transmission device;
  wherein said transmitting comprises transmitting to said first mobile transmission device, together with said at least one said selected message transmitted to said first mobile transmission device, a Cartesian coordinate pair specifying a position at which said message was displayed on a screen of said second mobile transmission device for reproduction of a position at which said at least one selected message should be displayed on a second screen associated with said first mobile transmission device.

6. The method of claim 5, wherein said request for messages from said first mobile transmission device is limited to messages within a specific category and x and y distance from a present said longitude and said latitude, irrespective of named locations or topography within said distance.

7. The method of claim 5, wherein each said transmitted message is rendered as a graphic overlay, as generated on said second mobile transmission device, simultaneous with live video from said first mobile transmission device.

8. The method of claim 5, wherein an approximate location is determined for either said first or second mobile transmission device based on IP (internet protocol) address and said method of claim 5 is carried out; and
  when a more precise location becomes available based on global positioning system data (GPS) said method of claim 5 is carried out a second time using said more precise location data.

* * * * *